3,016,301
Patented Jan. 9, 1962

3,016,301
PROCESSES FOR IMPROVING THE TENDERNESS AND FLAVOR OF MUTTON
Beverly E. Williams, La Grange Park, Ill., assignor to Hodges Research and Development Company, New York, N.Y., a corporation of California
No Drawing. Filed July 14, 1959, Ser. No. 826,917
2 Claims. (Cl. 99—107)

This invention relates to processes for improving the tenderness and flavor of old crop (yearling) lamb and mutton so that the mutton has the flavor and tenderness of spring lamb.

At the present time mutton is not extensively sold in the trade. An average sheep and lamb kill will amount to approximately 99% lamb and 1% mutton with the mutton selling for about one-half the price of lamb. Mutton is not acceptable to the trade at large because of its woolly taste and odor. A national distributor of lamb and mutton has estimated that the kill of yearling lamb and sheep could be increased at least 15% if the objectionable woolly taste could be eliminated and the tenderness improved particularly of younger and better type of sheep. Further, the value of such mutton would be increased by from 10 to 15 cents per pound if the tenderness and flavor of the mutton could be improved.

Most unexpectedly, I have found that, if sheep are injected on the killing floor immediately after slaughter with a monosodium glutamate solution and thereafter subjected to elevated temperatures for a period of time sufficient to induce rigor mortis and then chilled, the mutton attains the flavor and tenderness of lamb. The woolly taste and odor are completely eliminated. This result is most unexpected since monosodium glutamate has heretofore been known as a taste enhancer. It would be expected therefore that injection of monosodium glutamate into the mutton would increase the woolly taste rather than reduce it.

The amount of monosodium glutamate injected into the sheep is critical. Experience has shown that .075 pound of monosodium glutamate per hundred pounds of carcass meat or .4 to .6 ounce of monosodium glutamate per pound of injection solution will eliminate the woolly taste of freshly slaughtered sheep. The injection solution is stitch pumped into the dressed sheep in amounts approximating 3% by weight of the dressed sheep. Since dressed sheep lose approximately 3% by weight due to refrigeration shrinkage it will be obvious that the processes of the present invention minimize loss by shrinkage.

The amount of monosodium glutamate injected into an 80 pound sheep carcass is approximately one ounce. Lesser amounts of monosodium glutamate had very little, if any, effect in eliminating the undesirable muttony taste and greater amounts did not significantly change or improve the flavor. The amounts of monosodium glutamate as discussed above establish a level to eliminate the woolly and gamey taste and flavor.

As noted above, immediately after injection of the monosodium glutamate solution the dressed sheep carcass is heat treated to elevate its temperature and then chilled. The heat treatment is preferably performed by microwave heating and/or in a 100% steam heated room until the internal body temperature of the sheep has been elevated to about 10° to 15° above normal. The internal body temperature of the sheep is therefore elevated to temperatures of approximately 108° to 115° F. The sheep carcasses are then chilled in a cooler in the usual way.

When old or last year's crop lambs, generally called yearlings, or young sheep carcasses are treated by the processes above described taste panel experts have pronounced the mutton to have the flavor and tenderness of lamb without the objectionable woolly flavor of mutton.

It should be apparent to those skilled in the art that the processes as above described are capable of various procedural modifications within the present inventive concept. Reference should therefore be had to the appended claims to determine the scope of this invention.

What is claimed is:

1. A process for improving the tenderness and flavor of yearling lamb and mutton including the steps of stitch pumping the dressed carcass immediately after slaughter with a solution of monosodium glutamate the solution weighing approximately 3% by weight of the weight of the carcass and containing .4 to .6 ounce of monosodium glutamate per pound of injection solution, then increasing the internal body temperature of the dressed carcass to about 108° to 115° F. and then chilling the carcass.

2. In a process for improving the tenderness and flavor of yearling lamb and mutton the steps of injecting on the killing floor the freshly slaughtered carcass before rigor mortis with a solution of monosodium glutamate weighing approximately 3% of the weight of the carcass and containing approximately .4 to approximately .6 ounce of monosodium glutamate per pound of injection solution, then heating the carcass to an internal body temperature of approximately 108° to 115° F. until rigor mortis is induced and then chilling the carcass.

References Cited in the file of this patent

UNITED STATES PATENTS

| | | |
|---|---|---|
| 2,687,961 | Ellis | Aug. 31, 1954 |
| 2,709,658 | Buchanan | May 31, 1955 |
| 2,852,391 | Williams | Sept. 16, 1958 |
| 2,870,018 | Williams | Jan. 20, 1959 |

FOREIGN PATENTS

| | | |
|---|---|---|
| 567,193 | Canada | Dec. 9, 1958 |